Figure 1:
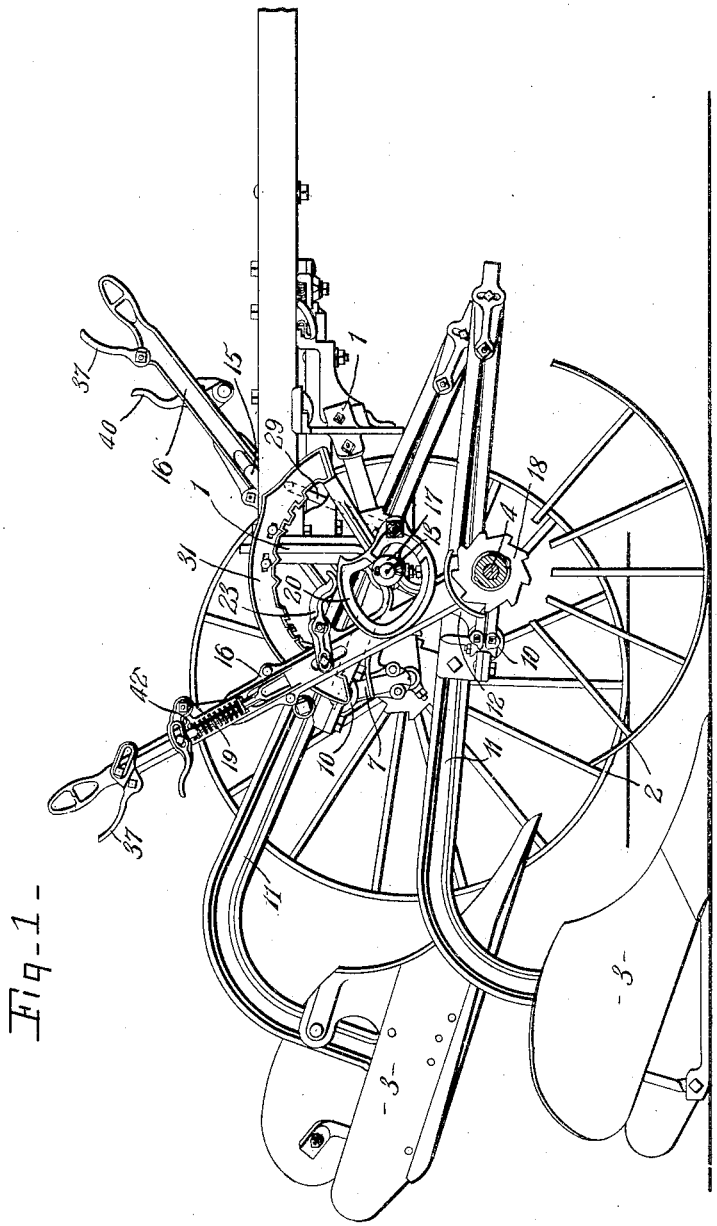

W. H. LEE.
SULKY PLOW.
APPLICATION FILED JULY 23, 1909.

941,887.

Patented Nov. 30, 1909.
2 SHEETS—SHEET 1.

WITNESSES:
Chas H Young
S. Davis

INVENTOR
William H Lee
BY
Parsons Hall & Bodell
ATTORNEYS

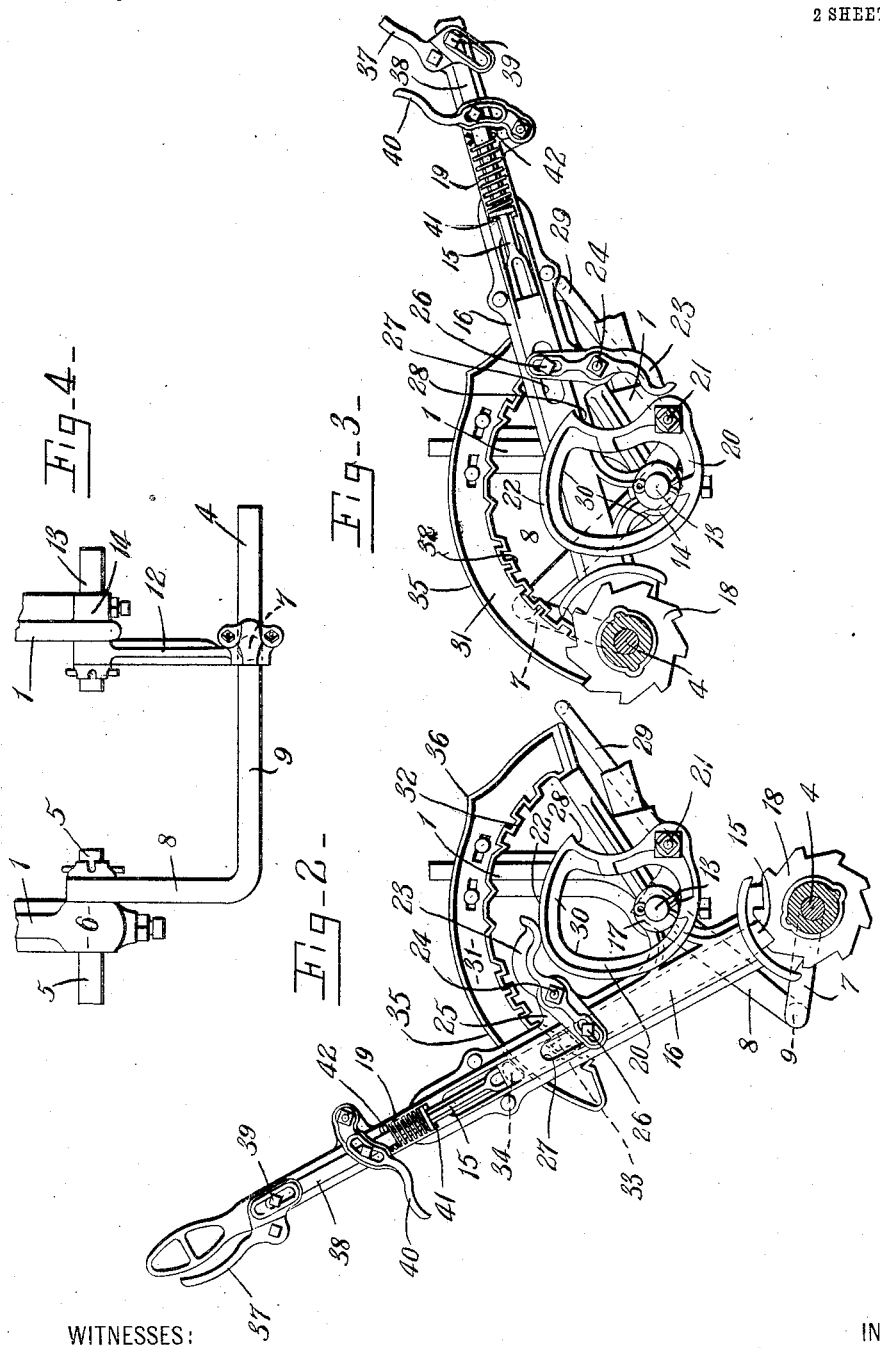

UNITED STATES PATENT OFFICE.

WILLIAM H. LEE, OF SYRACUSE, NEW YORK, ASSIGNOR TO SYRACUSE CHILLED PLOW COMPANY, OF SYRACUSE, NEW YORK, A CORPORATION OF NEW YORK.

SULKY-PLOW.

941,887.  Specification of Letters Patent.  Patented Nov. 30, 1909.

Application filed July 23, 1909. Serial No. 509,093.

*To all whom it may concern:*

Be it known that I, WILLIAM H. LEE, of Syracuse, in the county of Onondaga and State of New York, have invented a certain new and useful Sulky-Plow, of which the following is a specification.

My invention relates to sulky plows and has for its object a particularly simple and efficient means for controlling the raising of the earth-turning elements thereof, and it consists in the combinations and constructions hereinafter set forth and claimed.

In describing this invention, reference is had to the accompanying drawings, in which like characters designate corresponding parts in all the views.

Figure 1 is a side elevation, partly broken away, of a plow embodying my invention. Fig. 2 is a detail view of a portion of the means for raising one of the earth-turning elements. Fig. 3 is a view similar to Fig. 2, showing the parts in their positions occupied when the earth-turning element is raised. Fig. 4 is a detail of the crank axle looking to the right in Fig. 2, part of the frame being also shown.

My invention is here illustrated as embodied in a reversible hillside sulky plow having two earth-turning elements, or plows proper, arranged to turn respectively right and left furrows, said elements being shiftable into and out of the ground independently of each other. However, this invention may be embodied in any type of sulky plow.

1 is the frame of the plow; 2 are ground or supporting wheels arranged on opposite sides of the frame; 3 are earth-turning elements, or plows proper, the beams of which are pivotally connected respectively to crank axles upon which the ground wheels are loosely mounted, these axles being also pivotally connected to the frame.

As best seen in Fig. 4, each crank axle is formed at its outer end with a spindle 4 carrying one of the ground wheels, and is journaled at its opposite or inner end on a spindle 5 fixed in a bearing 6 associated with the frame 1. Each axle is also formed with crank portions 7, 8 extending laterally from the spindles 4, 5 and connected by a cross arm 9 which is journaled in a suitable bearing 10 (Fig. 1) fixed to the beam 11 of one of the plows or earth-turning elements.
Moreover, each axle is also formed with a crank portion 12 extending parallel to the crank portion 8 and clamped or otherwise secured to the crank portion 7 of such axle, the crank portion 12 being journaled at its free end on a spindle 13, which is fixed in a bearing 14 associated with the frame 1, and axially alined with the bearing 6 of the frame, the spindles 5 and 13 and the crank portions 8 and 12 forming a pivotal connection between the frame 1 and the axle provided with such crank portions. The axles form no part of this invention, and any other suitable axles may be substituted therefor.

The means for raising the earth-turning elements out of the ground and controlling the shifting thereof into the ground are alike in construction and a description of one of such means is sufficient. Said means includes a clutch member for connecting one ground wheel with the corresponding axle, and a cam movably mounted on the frame, the clutch member being normally out of connection with the ground wheel and the cam operating to move the clutch member into connection with such ground wheel.

As here shown, the clutch member comprises a sliding pawl 15, Fig. 2, carried by, and slidable lengthwise of, a movable part, as a lever 16 mounted on the spindle 4 and having a bearing 17 between its ends which receives the spindle 13 for the crank portion 12 of the corresponding axle. The clutch member 15 coöperates with a ratchet wheel 18 rigid with the ground wheel 2 on the spindle 4 and is normally held out of engagement with the ratchet wheel 18 by a spring 19. Said clutch member 15 is movable into engagement with the ratchet wheel 18 by a cam 20 pivoted at 21, Figs. 2 and 3, to the frame 1 and having a surface 22 eccentric with its pivot 21, said surface coacting with the advance end of one arm of a power-transmitting part, as a lever 23 which is pivoted intermediate of its ends at 24 to a lug 25 on the lever 16, the other arm of the lever 23 being connected to the clutch member 15 by a pin-and-slot, the pin 26 of which extends transversely through a slot 27 in the lever 16 and into the clutch member 15.
The cam 20 is also formed with a cutaway portion at 28 at the end of the surface 22 for permitting the advance end of the lever 23 to be depressed after said lever 23 has traveled over the surface 22 and the earth-turning element has been raised to a predetermined height.

The cam 20 is moved on its pivot 21 by a suitable arm or element 29, fixed thereto, and is returned by gravity to its normal position. As here shown, the cam 20 is limited in its pivotal movement by the bearing 17 of the lever 16, which bearing projects into an opening 30 provided in the cam 20 and is engaged by opposite sides of such opening. The lever 16 moves along a sector 31 fixed to the frame 1 and arranged concentric with the axis of the spindle 13, the sector being provided with rack teeth 32 on its under side which coöperate with a pawl 33 on the clutch member 15, this pawl 33 holding the earth-turning element in its raised position. When the clutch member 15 is moved into engagement with the ratchet wheel 18, said pawl 33 is moved out of engagement with the rack 32. The clutch member 15 is also formed with a laterally-extending lug or shoulder 34 which engages the upper face 35 of the sector 31, said face being arranged concentric with the axis for the spindle 13 for the crank portion 12 of the axle. The sector is also formed near the advance end of its upper face with a cam 36 located in position to engage the shoulder 34 when the earth-turning element has been raised to a predetermined height, and to withdraw the clutch member 15 out of engagement with the ratchet wheel 18 and also to move the pawl 33 into engagement with the rack 32.

Preferably, the lever 16 is provided with a handle at its upper end and carries suitable levers, one of which, as 37, is connected by a link 38 to the clutch member 15 as by a pin-and-slot 39, the lever 37 operating to depress the clutch member 15 sufficiently to move the pawl 33 out of engagement with the rack 32 but not sufficiently to shift the clutch member 15 into engagement with the ratchet wheel 18, in order that the plow may be shifted by hand. The other of the levers, as 40, carried by the lever 16, is also connected to the clutch member 15 in order to move the pawl 33, the lever 37 being more convenient to operate when the parts are in the positions shown in Fig. 2, and the lever 40 being more convenient to operate when the parts are in their positions shown in Fig. 3. The spring 19 which holds the clutch member 15 in its inoperative position, encircles the link 38 and is interposed between a lug 41 on the lever 16 and a shoulder 42 associated with the link.

In operation, when it is desired to raise the earth-turning element out of the soil, the foot engaging the element or arm 29 is depressed moving the eccentric surface 22 of the cam 20 into engagement with, and slidably along, the power-transmitting lever 23 and operating said lever to depress the clutch member 15 into engagement with the ratchet wheel 18. The crank axle is thus connected by the clutch member 15 to the ground wheel thereon, and in effect by the travel of the sulky the parts are shifted until they occupy the positions seen in Fig. 3. The lever 23, during the movement of said parts, rides or slides on the eccentric surface 22 of the cam 20 and holds the clutch member 15 in engagement with the ratchet wheel 18 until the advance end of said lever reaches the cutaway portion 28 of the cam 20, whereupon the clutch member 15 will be withdrawn by the spring 19 out of engagement with the ratchet wheel 18, or in case the spring 19 is not strong enough to withdraw the clutch member 15 the shoulder 34 on such member engages the cam 36 on the advance end of the sector 31 and positively draws the clutch member 15 out of engagement with the ratchet wheel 18. For slightly raising the earth-turning element, the lever 37 may be operated and for permitting the earth-turning element to be depressed slightly from its raised position, the lever 40 may be operated. The lever 40 may also be used for forcing the clutch member 15 into engagement with the ratchet wheel 18 to effect the raising of the earth-turning element during the travel of the sulky.

What I claim, is:—

1. In a sulky plow, a frame, ground wheels supporting the frame, an earth-turning element connected to the frame, means for raising the earth-turning element comprising a clutch member shiftable into and out of connection with one of the ground wheels and being normally out of connection therewith, and means for shifting the clutch member into connection with one of the ground wheels to cause the first-mentioned means to raise the earth-turning element, the second-mentioned means including an engaging part associated with the clutch member, a movable cam supported by the frame and coacting with the engaging part, the cam being movable relatively to the frame and the engaging part for actuating the engaging part to move the clutch member into connection with said one of the ground wheels, and the engaging part being movable relatively to the cam and coacting therewith during said raising of the earth-turning element, and an operating element connected to the cam, substantially as and for the purpose described.

2. In a sulky plow, a frame, ground wheels supporting the frame, an earth-turning element connected to the frame, means for raising the earth-turning element comprising a movable part connected to the frame, and a clutch member carried by said part and shiftable into and out of connection with one of the ground wheels and being normally out of connection therewith, and means for shifting the clutch member into connection with one of the ground wheels to cause the first-mentioned means to raise the earth-turning element, the second-mentioned means including a power transmitting lever pivoted to said movable part and connected to the clutch-member, a cam pivoted to the frame and coacting with said lever, the cam being movable about its pivot relatively to the frame and the power transmitting lever for actuating said lever to move the clutch member into connection with said one of the ground wheels, and the power transmitting lever being movable on its pivot relatively to the cam and coacting therewith during said raising of the earth-turning element, and an operating element connected to the cam, substantially as and for the purpose specified.

3. In a sulky plow, a frame, ground wheels supporting the frame, an earth-turning element connected to the frame, means for raising the earth-turning element comprising a movable part connected to the frame, and a clutch member carried by said part and shiftable into and out of connection with one of the ground wheels and being normally out of connection therewith, and means for shifting the clutch member into connection with one of the ground wheels to cause the first-mentioned means to raise the earth-turning element, the second-mentioned means including a power transmitting lever pivoted between its ends to said movable part, and having one arm thereof connected to the clutch member, a cam pivoted to the frame and having an eccentric surface coacting with the other arm of the lever, the cam being movable about its pivot relatively to the frame and the power transmitting lever for causing the eccentric surface of the cam to actuate said lever to move the clutch member into connection with one of the ground wheels, and the power transmitting lever being movable on its pivot relatively to the cam and sliding along the eccentric surface thereof during said raising of the earth-turning element, and an operating element connected to the cam, substantially as and for the purpose set forth.

4. In a sulky plow, an axle having a spindle and two crank portions, a ground wheel loosely mounted on the spindle, a frame carried by one crank portion of the axle, an earth-turning element having a beam connected to the other crank portion of the axle, means for raising the earth-turning element comprising a lever mounted on the spindle and pivoted to the frame, a clutch member carried by the lever and shiftable into and out of connection with the ground wheel and being normally out of connection therewith, and means for shifting the clutch member into connection with the ground wheel including a power-transmitting part carried by the lever and connected to the clutch member, a cam pivoted to the frame and having an eccentric surface slidably coacting with the power-transmitting part during the raising of the earth-turning element and an operating element connected to the cam, substantially as and for the purpose specified.

5. In a sulky plow, an axle having a spindle and two crank portions, a ground wheel loosely mounted on the spindle, a frame carried by one crank portion of the axle said crank portion being provided with engaging means, an earth-turning element having a beam connected to the other crank portion of the axle, means for raising the earth-turning element comprising a lever mounted on the spindle and pivoted to the frame, a clutch member carried by the lever and shiftable into and out of connection with the ground wheel and being normally out of connection therewith, and means for shifting the clutch member into connection with the ground wheel including a power-transmitting part carried by the lever and connected to the clutch member, a cam pivoted to the frame and having an eccentric surface slidably coacting with the power-transmitting part during the raising of the earth-turning element and an operating element connected to the cam, said cam having an opening for receiving the engaging means on the crank portion of the axle carrying the frame, opposite walls of said opening being movable into engagement with said engaging means to limit the movement of the cam by the operating element, substantially as and for the purpose set forth.

6. In a sulky plow, a frame, ground wheels supporting the frame, an earth-turning element, means for raising the earth-turning element comprising a clutch member shiftable into and out of connection with one of the ground wheels and being normally out of connection therewith, means tending to return the clutch member to its normal position, and means for shifting the clutch member into connection with one of the ground wheels against the action of the returning means including an engaging part associated with the clutch member, a cam movably mounted on the frame and having a surface coacting with said part and also having a cutout for receiving the engaging part after the earth-turning element has been raised a predetermined extent and thereby permitting the clutch member to be returned to its normal position and an operating element connected to the cam, substantially as and for the purpose described.

7. In a sulky plow, a frame, ground wheels supporting the frame, an earth-turning element, means for raising the earth-turning element comprising a clutch member shiftable into and out of connection with one of the ground wheels and being normally out of connection therewith, and means for shifting the clutch member into connection with one of the ground wheels including an engaging part associated with the clutch member, a cam movably mounted on the frame and having a surface coacting with said part and also having a cutout for receiving the engaging part after the earth-turning element has been raised a predetermined extent and thereby permitting the clutch member to be returned to its normal position, a cam for moving the clutch member out of operative position after the engaging part has reached said cutout and an operating element connected to the first-mentioned cam, substantially as and for the purpose specified.

8. In a sulky plow, a frame, ground wheels supporting the frame, an earth-turning element, means for raising the earth-turning element comprising a clutch member shiftable into and out of connection with one of the ground wheels and being normally out of connection therewith, and means for shifting the clutch member into connection with one of the ground wheels to cause the first-mentioned means to raise the earth-turning element, the second-mentioned means including a movable engaging part associated with the clutch member, a cam movably mounted on the frame and having a surface detachably and slidably engaging said part and also having a cutout for receiving the engaging part after the earth-turning element has been raised a predetermined extent, the cam being movable relatively to the frame and the engaging part for causing said surface of the cam to actuate the engaging part, and the engaging part being movable relatively to the cam and slidably engaging said surface thereon during the raising of the earth-turning element, means for moving the clutch member out of operative position after the engaging part has reached said cutout, and an operating element connected to the cam, substantially as and for the purpose set forth.

9. In a sulky plow, an axle having a spindle and two crank portions, a ground wheel loosely mounted on the spindle, a frame pivoted to one crank portion of the axle said crank portion being provided with engaging means and the frame including a sector formed with a rack and with a cam, the latter being arranged near one end of the sector, said sector being arranged concentric with the pivot connecting the frame and the crank portion of the axle carrying the frame, an earth-turning element having a beam connected to the other crank portion of the axle, means for raising the earth-turning element comprising a lever mounted on the spindle and pivoted to the frame, the lever being movable along the sector, a clutch member carried by the lever and shiftable into and out of connection with the ground wheel and being normally out of connection therewith, a pawl connected to and movable with the clutch member and coacting with the rack of the sector for holding the lever, an engaging part carried by the clutch member and movable along the sector and coacting with the cam of the sector for returning the clutch member to its normal position, and means for shifting the clutch member into connection with the ground wheel and thereby moving the pawl out of connection with the rack, said means including a power-transmitting part carried by the lever and connected to the clutch member, a cam pivoted to the frame and having a surface coacting with the power-transmitting part and also having a cutout for receiving the power-transmitting part after the earth-turning element has been raised a predetermined extent and the engaging part of the clutch member is about to engage the cam of the sector and an operating element connected to the pivoted cam, said pivoted cam having an opening for receiving the engaging means on the crank portion of the axle carrying the frame, opposite walls of said opening being movable into engagement with said engaging means to limit the movement of the pivoted cam by the operating element, substantially as and for the purpose described.

In testimony whereof, I have hereunto signed my name in the presence of two attesting witnesses, at Syracuse, in the county of Onondaga, in the State of New York, this 21st day of July, 1909.

WILLIAM H. LEE.

Witnesses:
SHELDON S. SPIRE,
CALVIN R. DAVIS.